United States Patent [19]

Tsuchiya

[11] Patent Number: 5,012,354
[45] Date of Patent: Apr. 30, 1991

[54] TRAVELLING CARRIAGE DRIVING APPARATUS

[75] Inventor: Keishin Tsuchiya, Yokohama, Japan
[73] Assignee: Ricoh Company, Ltd., Tokyo, Japan
[21] Appl. No.: 340,789
[22] Filed: Apr. 20, 1989
[30] Foreign Application Priority Data Apr. 27, 1988 [JP] Japan .............................. 63-56893[U]
Jun. 8, 1988 [JP] Japan .............................. 63-76263[U]

[51] Int. Cl.[5] .............................................. H04N 1/04
[52] U.S. Cl. ..................... 358/474; 358/486; 358/494; 358/497
[58] Field of Search ............... 358/473, 474, 475, 482, 358/483, 484, 486, 493, 494, 497, 498; 367/150, 149, 157, 180; 73/655, 653

[56] References Cited

U.S. PATENT DOCUMENTS 4,521,814 6/1985 Ono et al. .............................. 358/296

FOREIGN PATENT DOCUMENTS 0010730 1/1979 Japan .................................. 358/474
61-18256 1/1987 Japan .
62-112255 7/1987 Japan .

*Primary Examiner*—Edward L. Coles, Sr.
*Assistant Examiner*—Jerome Grant, II
*Attorney, Agent, or Firm*—Oblon, Spivak, McClelland, Maier & Neustadt

[57] ABSTRACT

A travelling carriage driving apparatus includes a unit being controlled so as to be always located in a predetermined position, and a travelling carriage accommodating the unit. A guide mechanism allows the travelling carriage to be freely reciprocated. A deviation detecting mechanism detects a deviation of the unit from the predetermined position during the movement of the travelling carriage. A unit position adjusting mechanism is coupled to the unit and the travelling carriage, and moves in a predetermined direction, the unit accommodated in the travelling carraige. A controller controls the unit position adjusting mechanism in accordance with the detected deviation of the unit so that the unit is located in the predetermined position.

26 Claims, 5 Drawing Sheets

FIG. I
PRIOR ART
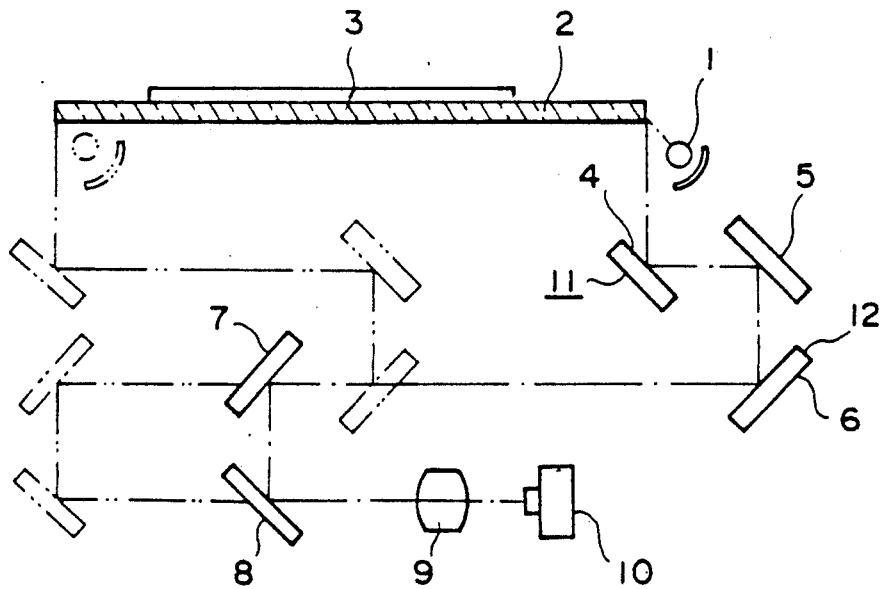
FIG. 2
PRIOR ART
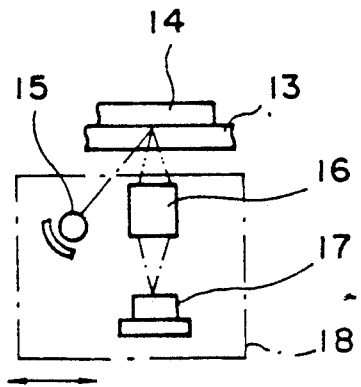

TRAVELLING CARRIAGE DRIVING APPARATUS

BACKGROUND OF THE INVENTION

The present invention generally relates to a travelling carriage driving apparatus, and more particularly to a full-size contact type scanner in which a full-size contact sensor is movably provided.

Conventionally, a reduction optical system scanner as shown in FIG. 1 is known as a scanner for optically reading pictures or images on a document. Referring to FIG. 1, light emitted from a light source 1 is projected onto a document 3 placed on a contact glass 2. The light reflected on the document 3 passes through first to fifth mirrors 4, 5, 6, 7 and 8, and an image formation lens 9, which forms a reduced image on a photoelectric conversion element 10 such as a charge-coupled device image sensor. The document 3 and the photoelectric conversion element 10 are placed in respective fixed positions. The light source 1 and the first mirror 4 are mounted on a first travelling carriage 11. The second and third mirrors 5 and 6 are mounted on a second travelling carriage 12. As is well known, the first and second travelling carriages 11 and 12 are moved in the speed ratio 2:1.

In the above-mentioned reduction optical system scanner where the document 3 and the photoelectric conversion element 10 are fixedly provided, an image can be correctly formed even when the first and second mirrors 4 and 5 move in a rickety state occurring in a direction perpendicular to the drawing sheet. Thus, it is not necessary to construct guide means for guiding the movement of the first and second travelling carriages 11 and 12 with high precision. For this reason, the guide means may be constructed with such a simple structure that the first and second travelling carriages 11 and 12 slide on poles or plate-shaped guides.

However, the reduction optical system itself provided in the reduction optical system scanner is large in size, and therefore the entire reduction optical system scanner is large.

Recently, a full-size contact type scanner as shown in FIG. 2 has attracted attention. Referring to FIG. 2, light emitted from a light source 15 is projected onto a document 14 placed on a contact glass 13, and is reflected thereon. A reflected light passes through a full-size image formation element 16, and forms an image on a full-size contact sensor 17 such as a charge-coupled device image sensor.

In full-scale type scanners such as the above, the document is held stationary, while the full-size contact sensor 17 is mounted on a travelling carriage 18 together with the light source 15 and the full-size image formation element 16, and is moved during the scan. If an error in position in the direction perpendicular to the drawing sheet (lateral vibration) occurs in the travelling carriage 18 during its movement, an error occurs in position between the document 14 and the full-size contact sensor 17 in the main scanning direction. This causes a jitter, which causes deformation of read-out images. The deformation increases with an increase of the resolution (such as an increase of 400 dpi→600 dpi→800 dpi). From this viewpoint, the straightness of the movement is required for full-size type image sensors. A stricter straightness is required, as the read pixel density is increased. For this reason, it is necessary to use precise guide means for moving the travelling carriage 18.

Improved travelling carriage driving systems are disclosed in Japanese Laid-Open Patent Application No. 61-18256 and Japanese Laid-Open Utility Model Application NO. 62-112255. Each of these documents proposes a driving system in which driving wires coupled to a travelling carriage are stretched on both sides thereof. However, the movement of a scanner fastened to the travelling carriage depends on a state of stretched wires or bearings. Therefore, it is very difficult to move the travelling carriage with high straightness. An improved guide is proposed in Japanese Laid-Open Patent Application No. 61-18256. However, the proposed guide is constructed by mechanical components, and therefore abrasion occurs therein with use. From this reason, it is very difficult to ensure the straightness of the movement of the travelling carriage simply by using mechanical components. Particularly, the travelling carriage used in the scanner is frequently reciprocated. Therefore, the occurrence of abrasion is a serious problem to be overcome.

SUMMARY OF THE INVENTION

It is therefore a general object of the present invention to provide a novel and useful travelling carriage driving apparatus in which the above-mentioned disadvantages are eliminated.

A more specific object of the present invention is to provide a travelling carriage driving apparatus which is simple and capable of precisely moving a travelling carriage having less time-deterioration in straightness even if abrasion occurs in a guide on which the travelling carriage slides.

The above objects of the present invention can be achieved by a travelling carriage driving apparatus comprising a unit controlled so as to be always located in a predetermined position, and a travelling carriage accommodating the unit. A guide mechanism allows the travelling carriage to be freely reciprocated. A deviation detecting mechanism detects a deviation of the unit from the predetermined position during the movement of the travelling carriage. A unit position adjusting mechanism is coupled to the unit and the travelling carriage, and moves in a predetermined direction, the unit being accommodated in the travelling carriage. A controller controls the unit position adjusting mechanism in accordance with the detected deviation of the unit so that the unit is located in the predetermined position.

Other objects, features and advantages of the present invention will become apparent from the following detailed description when read in conjunction with the accompanying drawings.

BRIEF DESCRIPTION OF THE DRAWINGS

FIG. 1 is a schematic side view illustrating a conventional reduction optical system scanner;

FIG. 2 is a schematic side view illustrating a conventional full-size contact type scanner;

DESCRIPTION OF THE PREFERRED EMBODIMENTS

Figure 3A:
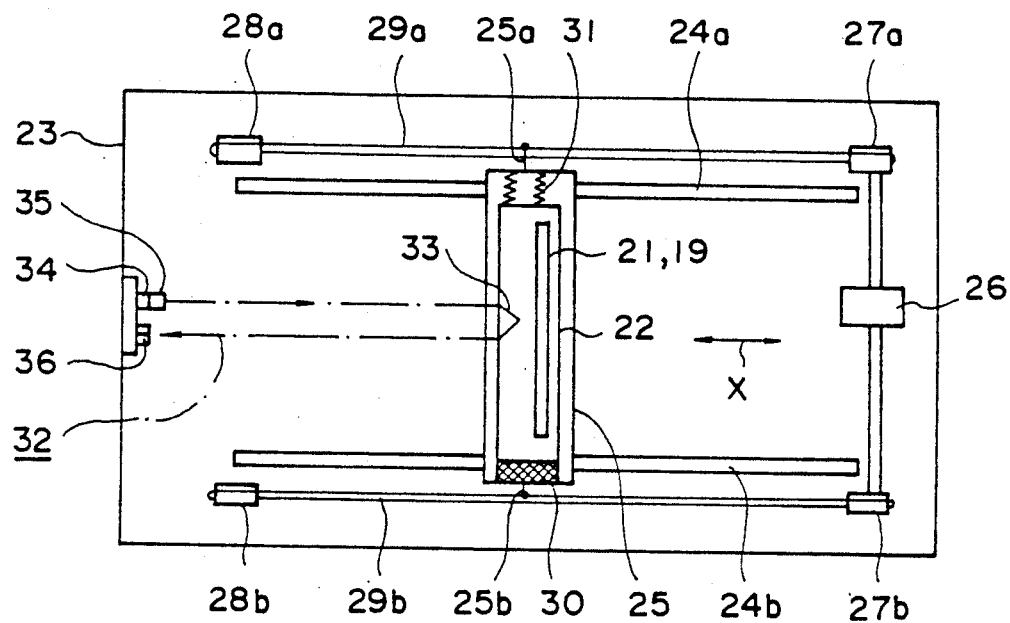
FIG. 3A is a plan view of a first preferred embodiment of the present invention.
Figure 3B:
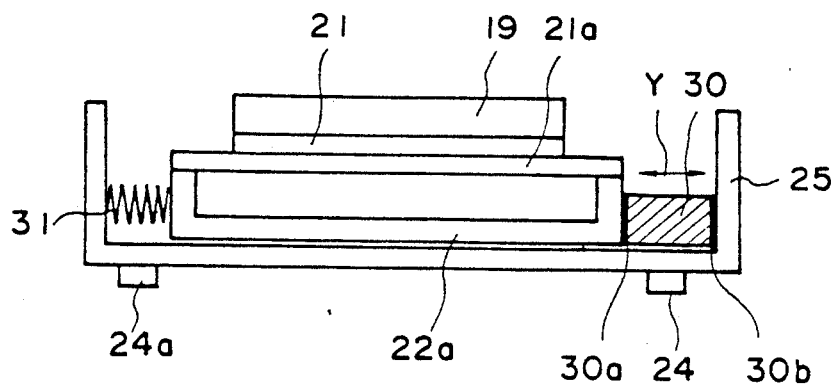
FIG. 3B is a side view of the first embodiment of FIG. 3A.

A description is given of a first preferred embodiment of the present invention. The first embodiment relates to a full-size contact type scanner. Referring to FIGS. 3A and 3B, there is illustrated a full-size contact type scanner of the first preferred embodiment of the present invention. An optical unit 22 is made up of a charge-coupled device mounting member (hereafter simply referred to as a CCD mounting member) 22a, a charge-coupled device substrate (hereafter simply referred to as a CCD substrate) 21a, a charge-coupled device (hereafter simply referred to as a CCD) 21, and a full-size image formation element 19. The CCD mounting member 22a has two vertical projections at opposed ends thereof, on which the CCD substrate 21a is mounted. The CCD 21 is formed on the CCD substrate 21a. The full-size image formation element makes in contact with the CCD 21. The optical unit 22 is accommodated in a travelling carriage 25 having a substantially U-shaped section in a manner described later. The travelling carriage 25 is movably supported on two parallel guide shafts (rails) 24a and 24b so as to be freely reciprocated linearly. The two parallel guide shafts 24a and 24b are arranged in a body or casing 23 of a full-size contact type scanner.

On the right-hand side of the scanner body in FIG. 3A, there is provided a driving motor 26, which rotates a pair of driving pulleys 27a and 27b coupled to a shaft extending from both sides of the driving motor 26. Coupled driving pulleys 28a and 28b are provided opposite to the driving pulleys 27a and 27b, respectively. A driving wire 29a is stretched between the driving pulley 27a and the coupled driving pulley 28a along the guide shaft 24a. A driving wire 29b is stretched between the driving pulley 27b and the coupled driving pulley 28b along the guide shaft 24b. An end of the travelling carriage 25 is fastened to the driving wire 29a through a supporting member 25a. Similarly, an opposed end of the travelling carriage 25 is fastened to the driving wire 29a through a supporting member 25b. Thereby, the travelling carriage 25 can slide on the guide shafts 24a and 24b in accordance with the rotation of the driving motor 26.

The optical unit 22 is not fixedly fastened to the travelling carriage 25, but provided so as to slightly move in the horizontal direction perpendicular to the direction of the movement of the travelling carriage 25, or perpendicular to the guide shafts 24a and 24b. This is achieved as follows. A piezo element 30 made of lead zirconate titanate (PZT) for example, is sandwiched between one of the projections of the CCD mounting member 22a and an opposed wall of the travelling carriage 25. Electrodes 30a and 30b are formed on opposed surfaces of the piezo element 30. Two coil springs 31 are sandwiched between the other projection of the CCD mounting member 22a and an opposed wall of the travelling carriage 25. The coil springs 31 function to press the CCD mounting member 22a against the piezo element 30. The CCD mounting member 22a is slightly spaced from the bottom surface of the travelling carriage 25. It is noted that the piezo element 30 expands and contracts in the Y direction perpendicular to the movement of the travelling carriage 25, depending on the voltage applied across the electrodes 30a and 30b. In response to deformation of the piezo element 30, the optical unit 22 changes its position in the Y direction.

Figure 4:
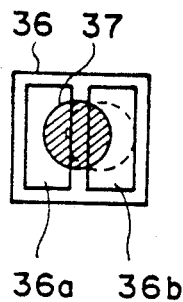
FIG. 4 is a view illustrating the movement of a spot of light formed on a 2-divided light receiving element used in the first embodiment shown in FIGS. 3A and 3B.
Figure 5:
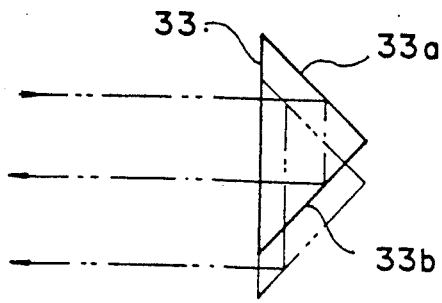
FIG. 5 is a view illustrating the movement of a rectangular prism due to a positional deviation of an optical unit used in the first embodiment.

A deviation detecting mechanism 32 is provided between the scanner body 23 and the optical unit 22. The deviation detecting mechanism 32 includes a rectangular prism 33, a semiconductor laser 34, a collimating lens 35, and a 2-divided light receiving element 36. The rectangular prism 33 is fastened to a center portion of a long-side wall of the optical unit 22. The assembly of the semiconductor laser 34 and collimating lens 35 is fastened to a wall of the scanner body 23 opposite to the rectangular prism 33. As shown in FIGS. 3A and 5, the semiconductor laser 34 is positioned so that a laser beam emitted therefrom goes toward an inclined plane 33a of the rectangular prism 33. The 2-divided light receiving element 36 is fastened to the same wall as the semiconductor laser 34, and is positioned so as to receive a light reflected on the other inclined plane 33b of the rectangular prism 33. The 2-divided light receiving element 36 has two light receiving portions 36a and 36b, which are arranged in the Y direction perpendicular to the main scanning direction. The 2-divided light receiving element 36 is positioned so that the laser beam which is emitted from the semiconductor laser 34 and is then reflected two times on the rectangular prism 33, forms a spot symmetrically on the light receiving portions 36a and 36b, as indicated by a reference numeral 37 shown in FIG. 4, when the optical unit 22 is located in a reference position. Each of the light receiving portions 36a and 36b generates a detection signal dependent on the intensity of light projected thereon.

Figure 6:
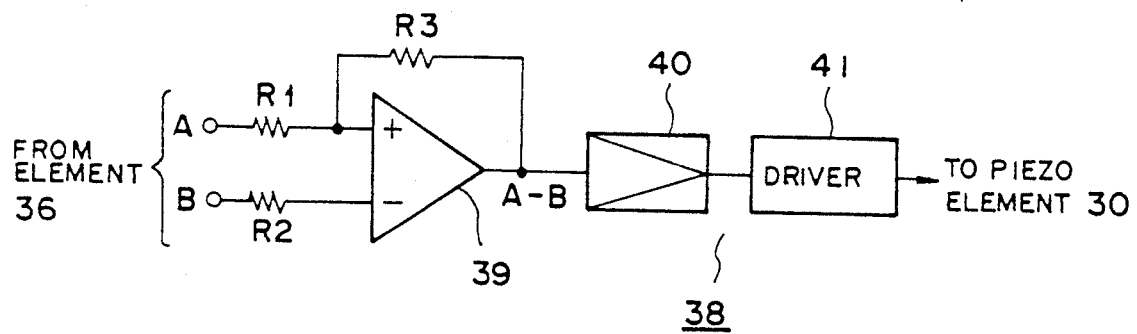
FIG. 6 is a block diagram of a controller used in the first embodiment.

The detection signals supplied from the light receiving portions 36a and 36b are supplied to a controller 38 shown in FIG. 6, which generates a control signal to be fed back to the piezo element 30. Referring to FIG. 6, the detection signal supplied from the light receiving portion 36a is applied to a non-inverting input terminal of a differential amplifier 39 through a resistor R1. The detection signal supplied from the light receiving portion 36b is applied to an inverting input terminal of the differential amplifier 39 through a resistor R2. A resistor R3 is connected across the non-inverting input terminal and output terminal of the differential amplifier 39. Assuming that A and B are levels of the detection signals supplied from the light receiving portions 36a and 36b, respectively, a level difference of A - B appears at the output terminal of the differential amplifier 39. The level difference A-B is amplified by an amplifier 40, which outputs a amplified level difference. A driver 41 generates a voltage dependent on the amplified level difference used for driving the piezo element 30. The voltage derived from the driver 41 varies in accordance with a change of the amplified level difference. As a result, the piezo element 30 is deformed depending on the applied voltage so as to position the optical unit 22 in the reference position where the spot of the reflected laser beam is formed symmetrically on the light receiving portions 36a and 36b. The controller 38 of FIG. 6 may be positioned inside or outside the scanner body 23.

In operation, the driving motor 26 is rotated, and correspondingly the travelling carriage 25 moves in accordance with the transportation of the driving wires 29a and 29b. At this time, if there is no deviation in the horizontal direction orthogonal to the main scanning direction (up and down directions of FIG. 3A), the laser beam emitted from the semiconductor laser 34 is reflected two times on the rectangular prism 33 and forms the spot symmetrically on the light receiving portions 36a and 36b. In this case, there is no difference between the levels A and B. The above-mentioned detecting operation is always available irrespective of scanning positions of the travelling carriage 25.

When the travelling carriage 25 does not move with straightness, and therefore a deviation in position thereof occurs in the Y direction perpendicular to the movement of the travelling carriage 25, the rectangular prism 33a moves as shown by a two-dotted chain line illustrated in FIG. 5. In accordance with a deviation of the rectangular prism 33, the spot of the laser beam formed on the light receiving portions 36a and 36b deviates from the center position as shown by a broken line illustrated in FIG. 4. As a result, a difference in the amount of received light between the light receiving portions 36a and 36b occurs. That is, a level difference between the detection signals A and B occurs. The differential amplifier 39 extracts the difference between the detection signals A and B, and outputs the level difference, which represents information on an amount of deviation in the Y direction and the direction of the deviation. The amount of deviation in the Y direction corresponds to an absolute value of the voltage appearing at the output terminal of the differential amplifier 39. The direction of the deviation corresponds to the polarily of the voltage at the output terminal of the differential amplifier 39. The driver 41 drives the piezo element 30 by adjusting the magnitude and polarity of the voltage to be applied to the piezo element 30 in accordance with the amplified level difference. Then, the piezo element 30 expands or contracts in the Y direction, depending on the applied voltage. Thereby, the optical unit 22 pressed against the piezo element 30 by the coil springs 31 is caused to move in the direction opposite to the direction in which the optical unit 22 deviates from the reference position. As the optical unit 22 is moved due to expansion or contraction of the piezo element 30, a difference in the amount of light received by the light receiving portions 36a and 36b decreases. Then, when the difference becomes zero, the optical unit 22 is located in the reference position, and is held stationary there.

The above-mentioned feed-back control is always activated during the scan. Thereby, it becomes possible to correctly and fixedly maintain the relatively positional relationship between the document and the optical components such as the CCD 21.

A mechanically strict precision is not required for the guide shafts 24a and 24b and components associated therewith. That is, the guide shafts 24a and 24b can be constructed by less expensive guide shafts. With the above-mentioned feed-back control, it becomes possible to compensate for a positional error of the optical unit 25 in the Y direction, which is caused mainly due to the occurrence of abrasion occurring in the guide shafts 24a and 24b with time.

In FIGS. 3A and 3B, a light source such as the light source 15 shown in FIG. 2, and a glass plate such as the glass plate 13 are omitted for the sake of simplicity. Those parts are provided in a conventional manner.

Figure 8:
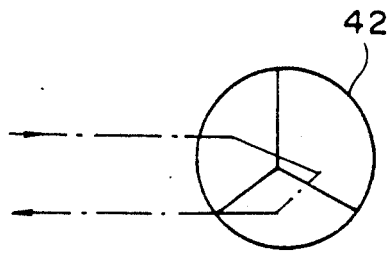
FIG. 8 is a corner cube prism used in the second embodiment.
Figure 9:
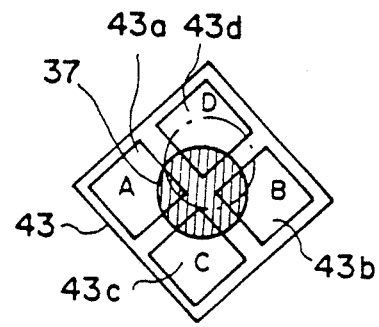
FIG. 9 is a 4-divided light receiving element used in the second embodiment.
Figure 7:
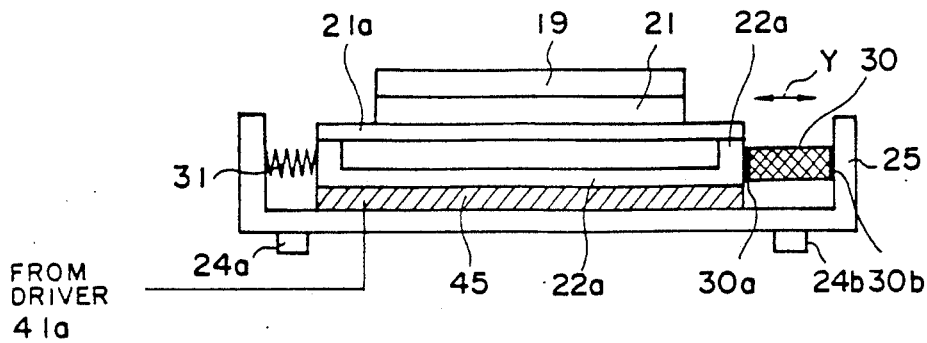
FIG. 7 is a side view of a second preferred embodiment of the present invention.

A description now given of a second preferred embodiment of the present invention. A plan view of the second embodiment is almost the same as FIG. 3A. FIG. 7 is a side view of the second embodiment. In FIG. 7, those parts which are the same as those in FIG. 3A are given the same reference numerals. Essential features of the second embodiment are as follows. First, a plate-shaped piezo element 45 is sandwiched between the bottom surface of the CCD mounting member 22a of the optical unit 22 and the bottom of the travelling carriage 25. In the illustrated embodiment, the plate-shaped piezo element 45 is formed on the entire bottom surface of the CCD mounting member 22a. The plate-shaped piezo element 45 is used for compensating a vertical deviation of the optical unit 22. Secondly, the rectangular prism 33 used in the first embodiment is replaced with a corner cube prism 42 as illustrated in FIG. 8. As is well known, a corner cube prism has three planes orthogonal to each other. Thirdly, a 4-divided light receiving element 43 as depicted in FIG. 9 is substituted for the 2-divided light receiving element 36 used in the first embodiment. The 4-divided light receiving element 43 includes four light receiving portions 43a, 43b, 43c and 43d, and is positioned so that a diagonal line passing corners of the light receiving portions 43a and 43b corresponds to the horizontal direction. When the optical unit 22 is located in the reference position, the light beam from the corner cube prism 42 forms the spot 37 symmetrically on the four light receiving portions 43a, 43b, 43c and 43d as shown in FIG. 9. When the optical unit 22 deviates from the reference position in both the Y direction and vertical direction, the spot formed on the 4-divided light receiving element 43 moves as shown by a one-dotted chain line illustrated in FIG. 9.

Figure 10:
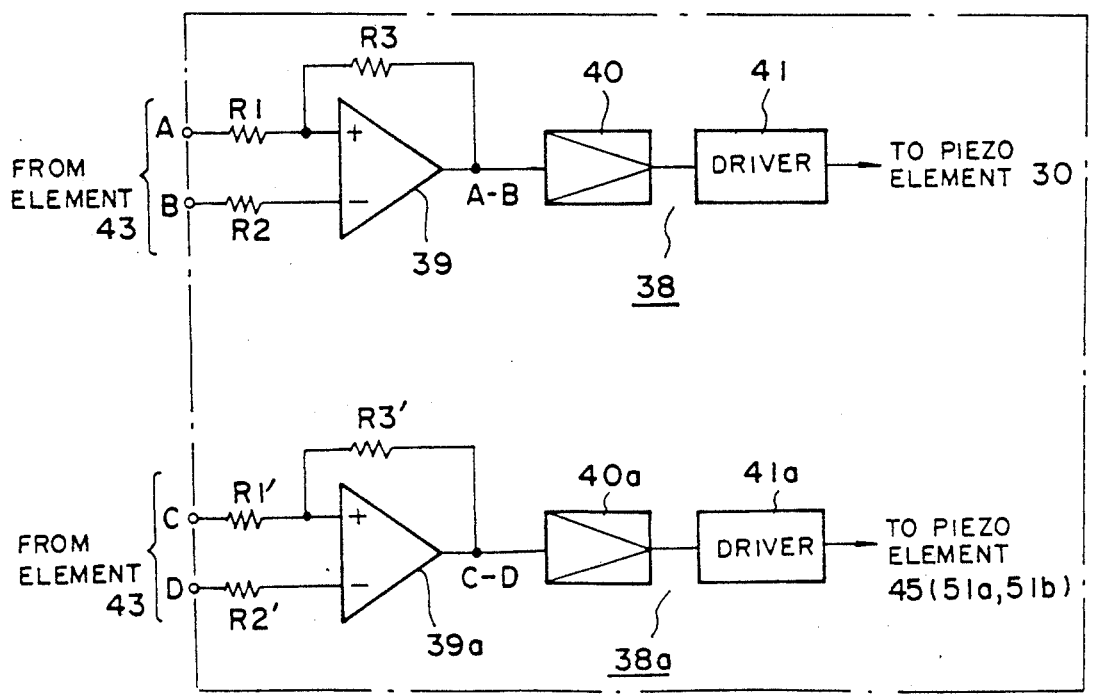
FIG. 10 is a controller used in the second embodiment.

Detection signals A, B, C and D derived from the light receiving portions 43a, 43b, 43c and 43d of the 4-divided light receiving element 43 are supplied to a controller illustrated in FIG. 10. The detection signals A and B supplied from the light receiving portions 43a and 43b are supplied to the controller 38, which is the same as the controller 38 shown in FIG. 6. The detection signals C and D are supplied to a controller 38a, which is the same as the controller 38 and composed of resistors R1', R2', R3', a differential amplifier 39a, an amplifier 40a, and a driver 41a. The driver 41 of the controller 38 controls the piezo element 30, and the driver 41a controls the piezo element 45. The piezo element 30 expands or contracts depending on the difference in the amount of light between the light receiving portions 43a and 43b so as to move the optical unit 22 in the horizontal (Y) direction toward the the reference position. The piezo element 45 expands or contracts depending on the difference in the amount of light between the light receiving portions 43c and 43d so as to move the optical unit 22 in the vertical direction toward the reference position.

Figure 11:
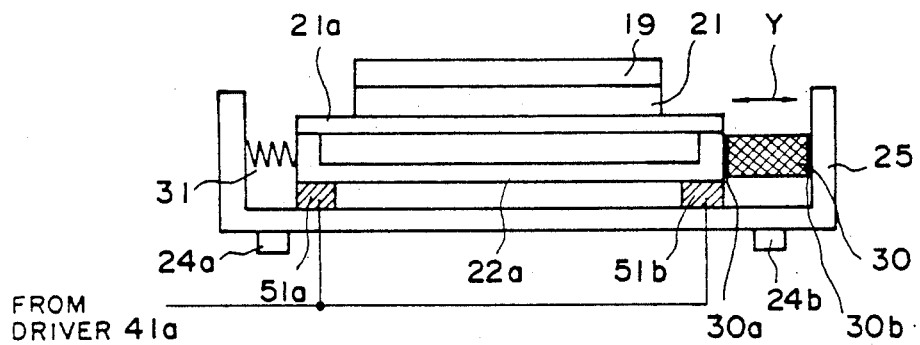
FIG. 11 is a view of a variation of the second embodiment.

In as shown in FIG. 11, the alternative, the plate-shaped piezo element 45 used in the embodiment of FIG. 7 may be replaced with a pair of piezo elements 51a and 51b, which extend in the direction perpendicular to the movement direction X and are fastened to both sides of the bottom surface of the CCD mounting member 22a. The pair of piezo elements 51a and 51b are connected in parallel, and is controlled by the driver 41a shown in FIG. 10.

Figure 12A:
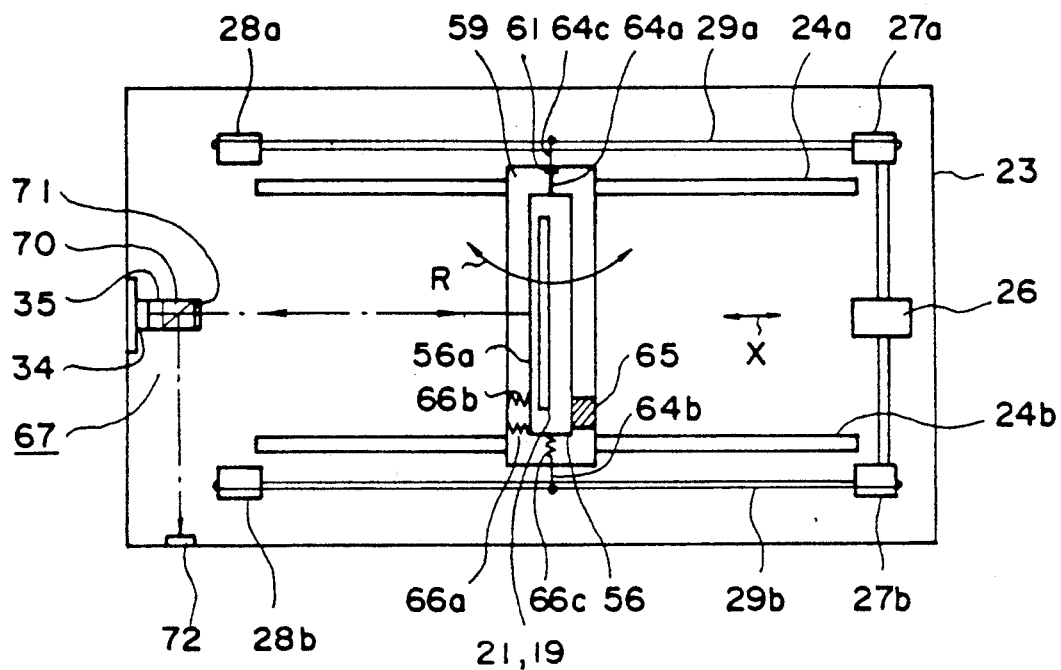
FIG. 12A is a plan view of a third preferred embodiment of the present invention.
Figure 12B:
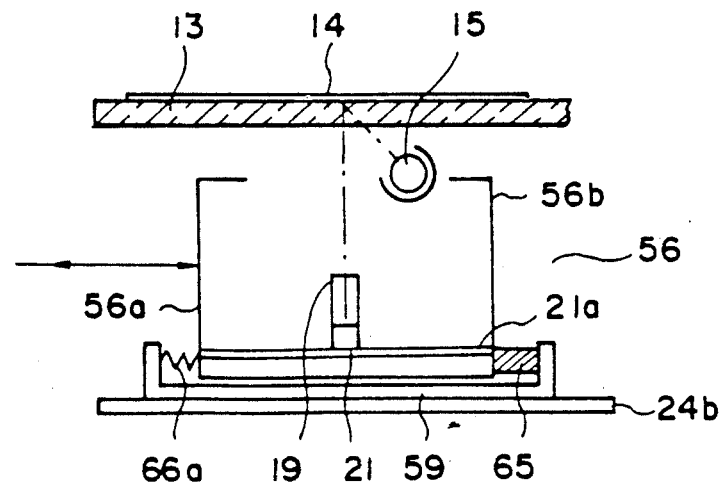
FIG. 12B is a side view of the third embodiment shown in FIG. 12A.

A description is given of a third preferred embodiment of the present invention with reference to FIGS. 12A and 12B, in which those parts which are the same as those in the previous figures are given the same reference numerals. Referring to FIGS. 12A and 12B, an optical unit includes a CCD mounting member 56b, CCD substrate 21a, CCD 21, full-size image formation element 19, and light source 15. A piezo element 65 is sandwiched between a wall of a travelling carriage 59 located along the vertical direction perpendicular to its movement direction X and a wall of the optical unit 56 opposite to the wall of the travelling carriage 59. Coil springs 66a and 66b are sandwiched between the other wall of the travelling carriage 59 extending in the vertical direction perpendicular to the movement direction X and an opposed wall of the optical unit 56. The coil springs 66a and 66b press the optical unit 56 against the piezo element 65. A supporting member 64a is interposed between a wall of the optical unit 56 and a wall of the travelling carriage 59. The supporting member 64a is secured to the wall of the optical unit 56 at one end thereof, and is rotatably supported at the other end by a bearing fastened to the wall of the travelling carriage 59. Thereby, the optical unit 56 can be rotated as indicated by the arrow R. A supporting member 64c is fixedly fastened to the driving wire 29a and the opposed wall of the travelling carriage 59. A supporting member 64b is fixedly fastened to the driving wire 29b and the opposed wall of the ravelling carriage 59. At need, a coil spring 66c may be provided between a wall of the travelling carriage 59 near the piezo element 65 and an opposed wall of the optical unit 56. With the above-mentioned structure, it becomes possible to rotatably move the optical unit 56, depending on expansion or contraction of the piezo element 65, so that the optical unit 56 is always positioned in the reference position.

A deviation detecting mechanism 67 is provided between the scanner body 23 and the optical unit 56. The deviation detecting mechanism 67 is made up of a beam splitter 70, a quarter wavelength (λ/4) plate 71, a 2-divided light receiving element 72 in addition to the above-mentioned semiconductor laser 34 and the collimating lens 35. The semiconductor laser 34, collimating lens 35, beam splitter 70, quarter wavelength plate 71 and 2-divided light receiving element 72 have the same optical axis and are arranged in this order from the wall of the scanner body 23 opposite to the driving motor 26. The 2-divided light receiving element 72 is disposed on the reflection side of the beam splitter 70 and is fastened to a wall of the scanner body 23 facing the driving wire 29b. A surface of the wall of the optical unit 56 opposite to the quarter wavelength plate 71 has a mirror surface 56a (FIG. 12B) on which the laser beam emitted from the semiconductor laser 34 is to be reflected. The beam splitter 70 and the quarter wavelength plate 71 are provided for separating the incident and reflected lights and preventing the reflected light from going toward the semiconductor laser 34. The 2-divided light receiving element 72 is the same as the 2-divided light receiving element 36. That is, the 2-divided light receiving element 72 has two light receiving portions arranged in the horizontal direction.

The deviation detecting mechanism 67 is positioned so that when the optical unit 56 is orthogonal to the scanning direction (x direction), the laser beam emitted from the semiconductor laser 34 is reflected on the mirror surface portion 56a of the optical unit 56, and forms the spot uniformly over the 2-divided light receiving element 72. The detection signals derived from the 2-divided light receiving element 72 are supplied to the controller 38 shown in FIG. 6.

When no yaw occurs in the optical unit 56, the laser beam forms the spot symmetrically on the 2-divided light receiving element 72. Therefore, no level difference occurs, and the optical unit 56 is controlled so as to maintain its present state. When a yaw occurs in the optical unit 56, the optical path of the light reflected on the mirror surface portion 56a deviates from the optical path of the incident light from the semiconductor laser 34. This causes the spot imaged on the 2-divided light receiving element 72 to deviate from the original position. This causes the difference in level between the detection signals supplied from the 2-divided light receiving element 72. Then the piezo element 65 is supplied with the control signal which causes the optical unit 56 to move to the original (reference) position. When the difference in level between the detection signals becomes zero, the optical unit 56 becomes positioned in the reference position, and is held there. The third embodiment presents advantages similar to those presented by the first embodiment.

The present invention is not limited to the aforementioned embodiments, and variations and modifications may be made without departing from the scope of the present invention.

What is claimed is:

1. A travelling carriage driving apparatus comprising:

a unit controlled so as to be always located in a predetermined position;

a travelling carriage accommodating said unit;

guide means for allowing said travelling carriage to be freely reciprocated;

deviation detecting means for detecting a deviation of said unit from said predetermined position during the movement of said travelling carriage, said deviation of said unit occurring when said travelling carriage is being moved;

unit position adjusting means, coupled to said unit and said travelling carriage, for moving, in a predetermined direction, said unit accommodated in said travelling carriage; and controlling means for controlling said unit position adjusting means in accordance with said detected deviation of said unit which is moving along with said travelling carriage so that said unit is located in said predetermined position.

2. A travelling carriage driving apparatus as claimed in claim 1, wherein:

(a) said travelling carriage has first and second walls opposite to each other in the direction of the movement of said travelling carriage, (b) said unit has a first wall opposite to said first wall of said travelling carriage, and a second wall opposite to said second wall of said travelling carriage, (c) said unit position adjusting means includes a piezo element and a spring, (d) said piezo element is sandwiched between said first walls of said travelling carriage and said unit, (f) said spring is sandwiched between said second walls of said travelling carriage and said unit, said spring pressing said unit against said piezo element, (g) a supporting member which is interposed between said unit and said travelling carriage in a direction perpendicular to the direction of the movement of said travelling carriage and which rotatably supports said unit accommodated in said travelling carriage, (h) said controlling means includes means, coupled to said deviation detecting means, for generating an electric signal dependent on said detected deviation, and (i) said controlling means supplies said electric signal to said piezo element so that said piezo element expands or contracts depending on said electric signal, and thereby said unit is controlled to be located in said predetermined position.

3. A travelling carriage driving apparatus as claimed in claim 1, wherein said unit includes an photoelectric conversion element.

4. A travelling carriage driving means as claimed in claim 1, wherein said guide means comprises:
  first and second guide rails arranged in parallel in the horizontal direction of the movement of said travelling carriage, said travelling carriage sliding on said plurality of guide rails;
  first and second driving wires stretched along said first and second guide rails, said travelling carriage being fixedly coupled to said first and second driving wires; and
  a driving motor driving said stretched first and second driving wires, said first and second driving wires being transported at a speed.

5. A travelling carriage driving apparatus as claimed in claim 1, wherein said unit includes a charge-coupled device image sensor array arranged in the horizontal direction perpendicular to the direction of the movement of said travelling unit.

6. A travelling carriage driving apparatus as claimed in claim 5, wherein said charge-coupled device image sensor array is a full-size charge-coupled device image sensor array.

7. A travelling carriage driving apparatus as claimed in claim 6, wherein said unit includes a full-size image formation element mounted on said charge-coupled device image sensor array.

8. A travelling carriage driving apparatus as claimed in claim 1, wherein:
  (a) said travelling carriage has first and second walls opposite to each other,
  (b) said unit has a first wall opposite to said first wall of said travelling carriage, and a second wall opposite to said second wall of said travelling carriage,
  (c) said unit position adjusting means includes a piezo element and a spring,
  (d) said piezo element is sandwiched between said first walls of said travelling carriage and said unit,
  (f) said spring is sandwiched between said second walls of said travelling carriage and said unit, said spring pressing said unit against said piezo element,
  (g) said controlling means includes means, coupled to said deviation detecting means, for generating an electric signal dependent on said detected deviation, and
  (h) said controlling means supplies said electric signal to said piezo element so that said piezo element expands or contracts depending on said electric signal, and thereby said unit is controlled to be located in said predetermined position.

9. A travelling carriage driving apparatus as claimed in claim 8, wherein said piezo element expands or contracts in a horizontal direction perpendicular to the direction of the movement of said travelling carriage.

10. A travelling carriage driving apparatus as claimed in claim 8, wherein said spring includes a plurality of coil springs.

11. A travelling carriage driving apparatus as claimed in claim 8, wherein said piezo element comprises lead zirconate titanate.

12. A travelling carriage driving apparatus as claimed in claim 1, wherein said deviation detecting means comprises light emitting means for emitting a light toward said unit, reflecting means, fastened to said unit, for reflecting said light emitted from said light emitting means, and photoelectric electric conversion means for converting said light reflected by said reflecting means into a corresponding detection signal, and wherein said controlling means controls said unit position adjusting means in accordance with said converted electric detection signal corresponding to said detected deviation of said unit so that said unit is located in said predetermined position.

13. A travelling carriage driving apparatus as claimed in claim 12, wherein said reflecting means comprises a rectangular prism fastened to said unit.

14. A travelling carriage driving apparatus as claimed in claim 12, wherein said light emitting means comprises a semiconductor laser and a collimating leans.

15. A travelling carriage driving apparatus as claimed in claim 12, further comprising a casing which accommodates at least said unit and said travelling carriage, wherein said light emitting means and said photoelectric conversion means are fastened to said casing so as to be opposite to said reflecting means fastened to said unit.

16. A travelling carriage driving apparatus as claimed in claim 12, wherein said photoelectric conversion means includes two divided light receiving portions, and wherein when said unit is located in said predetermined position, said reflected light forms a spot symmetrically on said two divided light receiving portions.

17. A travelling carriage driving apparatus as claimed in claim 16, wherein said control means comprises,
  differential amplifier means for generating the difference in level between first and second electric detection signals respectively supplied from said two light receiving portions, said detection signal including said first and second detection signals, and
  driving means for driving said unit position adjusting means depending on said generated level difference.

18. A travelling carriage driving apparatus as claimed in claim 12, wherein said reflecting means comprises a coner cube prism fastened to said unit so as to face said light emitting means.

19. A travelling carriage driving apparatus as claimed in claim 1, wherein:
  (a) said travelling carriage has first and second walls opposite to each other and a bottom,
  (b) said unit has a first wall opposite to said first wall of said travelling carriage, a second wall opposite to said second wall of said travelling carriage, and a bottom,
  (c) said unit position adjusting means includes first and second piezo elements and a spring, (d) said first piezo element is sandwiched between said first walls of said travelling carriage and said unit, (f) said second piezo element is sandwiched between said bottom of said travelling carriage and said bottom of said unit, (g) said spring is sandwiched between said second walls of said travelling carriage and said unit, said spring pressing said unit against said first piezo element, (h) said controlling means includes means, coupled to said deviation detecting means, for generating first and second electric signals dependent on said detected deviation, and (i) said controlling means supplies said first and second electric signals to said first and second piezo elements, respectively, so that said first and second piezo elements expand or contract depending on said first and second electric signal, respectively, and thereby said unit is controlled to be located in said predetermined position.

20. A travelling carriage driving apparatus as claimed in claim 19, wherein said first electric signal depends on said detected deviation related to the horizontal direction perpendicular to the direction of the movement of said travelling carriage, and said second electric signal depends on said detected deviation related to the vertical direction orthogonal to the direction of the movement of said travelling carriage.

21. A travelling carriage driving apparatus as claimed in claim 19, wherein said second piezo element is a plate-shaped piezo element mounted on the entire bottom of said unit.

22. A travelling carriage driving apparatus as claimed in claim 19, wherein said second piezo element includes a pair of separated piezo elements arranged on opposed ends of said bottom of said unit.

23. A travelling carriage driving apparatus as claimed in claim 19, wherein said controlling means comprises first controlling means for generating a first control signal to be applied to said first piezo element depending on said detected deviation supplied from said deviation detecting means, and second controlling means for generating a second control signal to be applied to said second piezo element depending on said detected deviation supplied from said deviation detecting means.

24. A travelling carriage driving apparatus as claimed in claim 19, wherein said deviation detecting means comprises light emitting means for emitting a light toward said unit, reflecting means, fastened to said unit, for reflecting said light emitted from said light emitting means, and photoelectric conversion means for converting said light reflected by said reflecting means into corresponding electric detection signal, and wherein said controlling means controls said unit position adjusting means in accordance with said converted electric detection signal corresponding to said detected deviation of said unit so that said unit is located in said predetermined position.

25. A travelling carriage driving apparatus as claimed in claim 24, wherein said reflecting means comprises a corner cube prism fastened to said unit so as to face said light emitting means.

26. A travelling carriage driving apparatus as claimed in claim 24, wherein:

(a) said photoelectric conversion means comprises first, second, third and fourth light receiving portions which are arranged symmetrically at intervals of a predetermined angle and which generate first, second third and fourth electric detection signals, respectively, said first and third light receiving portions being diagonally arranged, said second and fourth light receiving portions being diagonally arranged, (b) said controlling means comprises;

(c) first differential amplifier means for generating a first difference in level between said first and third electric detection signals supplied from said photoelectric conversion means, (d) second differential amplifier means for generating a second difference in level between said second and fourth electric detection signals supplied from said photoelectric conversion means, (e) first driving means for driving said first piezo element depending on said first level difference supplied from said differential amplifier means, and (f) second driving means for driving said second piezo element depending on said second level difference supplied from said second differential amplifier means.

* * * * *